United States Patent
Chae

(10) Patent No.: US 11,308,955 B2
(45) Date of Patent: Apr. 19, 2022

(54) METHOD AND APPARATUS FOR RECOGNIZING A VOICE

(71) Applicant: LG ELECTRONICS INC., Seoul (KR)

(72) Inventor: Jong Hoon Chae, Seoul (KR)

(73) Assignee: LG ELECTRONICS INC., Seoul (KR)

(*) Notice: Subject to any disclaimer, the term of this patent is extended or adjusted under 35 U.S.C. 154(b) by 294 days.

(21) Appl. No.: 16/568,056

(22) Filed: Sep. 11, 2019

(65) Prior Publication Data
US 2020/0005789 A1    Jan. 2, 2020

(30) Foreign Application Priority Data

Jun. 20, 2019 (KR) .......................... 10-2019-0073478

(51) Int. Cl.
*G10L 15/22* (2006.01)
*G10L 15/08* (2006.01)
(Continued)

(52) U.S. Cl.
CPC ................ *G10L 15/22* (2013.01); *G06T 7/50* (2017.01); *G10L 15/063* (2013.01); *G10L 15/08* (2013.01);
(Continued)

(58) Field of Classification Search
CPC ......... F25D 29/00; G06F 40/268; G06K 9/46; G06N 3/008; G06T 7/50;
(Continued)

(56) References Cited

U.S. PATENT DOCUMENTS 8,880,402 B2 * 11/2014 Wasson ................... G10L 15/22
704/270.1
9,275,637 B1 * 3/2016 Salvador ................. G10L 15/06
(Continued)

FOREIGN PATENT DOCUMENTS

JP        2015102806      6/2015
KR     1020190001067     1/2019
(Continued)

OTHER PUBLICATIONS

Korean Intellectual Property Office Application No. 10-2019-0073478, Office Action dated Aug. 31, 2020, 6 pages.

*Primary Examiner* — Gerald Gauthier
(74) *Attorney, Agent, or Firm* — Lee, Hong, Degerman, Kang & Waimey PC

(57) ABSTRACT

Disclosed are a speech recognition device and a speech recognition method, which perform speech recognition by executing an artificial intelligence (AI) algorithm and/or a machine learning algorithm provided therein, and which can communicate with other electronic devices and an external server in a 5G communication environment. According to an embodiment, the speech recognition method includes setting an additional wake-up word target capable of activating a speech recognition function in addition to a preset wake-up word, generating a plurality of additional wake-up word utterances formed on the basis of the additional wake-up word target being uttered under various conditions, learning a wake-up word recognition algorithm by using each of the spoken utterances of the additional wake-up word to generate an additional wake-up word recognition algorithm, and executing the additional wake-up word recognition algorithm upon receiving a select word uttered by a user to determine whether to activate the speech recognition function.

15 Claims, 7 Drawing Sheets

(51) Int. Cl.
*G10L 15/06* (2013.01)
*G10L 15/30* (2013.01)
*G06T 7/50* (2017.01)

(52) U.S. Cl.
CPC .... *G10L 15/30* (2013.01); *G06T 2207/30196* (2013.01); *G10L 2015/088* (2013.01)

(58) Field of Classification Search
CPC ........... G06T 2207/30196; G10L 15/01; G10L 15/063; G10L 15/08; G10L 15/18; G10L 15/1815; G10L 15/22; G10L 15/24; G10L 15/26; G10L 15/285; G10L 15/30; G10L 15/32; G10L 2015/088; G10L 15/06; G10L 15/10; G10L 17/24; H04N 21/4432; H04R 3/005
USPC .... 704/243, 254, 270.1, 231, 238, 246, 251, 704/275
See application file for complete search history.

(56) References Cited

U.S. PATENT DOCUMENTS

| | | | | |
|---|---|---|---|---|
| 9,466,286 | B1* | 10/2016 | Hart | G10L 15/10 |
| 9,697,828 | B1* | 7/2017 | Prasad | G10L 15/18 |
| 10,236,017 | B1* | 3/2019 | Witt-Ehsani | G06F 40/216 |
| 10,332,507 | B2* | 6/2019 | Tang | G10L 15/22 |
| 10,360,910 | B2* | 7/2019 | Valentine | G10L 15/22 |
| 10,586,534 | B1* | 3/2020 | Argyropoulos | G10L 15/22 |
| 10,629,204 | B2* | 4/2020 | Mitic | G10L 15/08 |
| 10,692,495 | B2* | 6/2020 | Woo | G10L 15/08 |
| 10,796,702 | B2* | 10/2020 | Li | G10L 17/22 |
| 10,979,242 | B2* | 4/2021 | Ocher | H04L 12/282 |
| 10,997,973 | B2* | 5/2021 | Choi | G10L 15/08 |
| 11,062,703 | B2* | 7/2021 | Bauer | G10L 15/22 |
| 11,100,925 | B2* | 8/2021 | Chen | G10L 15/22 |
| 2012/0310646 | A1* | 12/2012 | Hu | G10L 15/02 704/238 |
| 2013/0289994 | A1* | 10/2013 | Newman | G10L 15/32 704/254 |
| 2013/0339028 | A1* | 12/2013 | Rosner | H04R 29/004 704/275 |
| 2014/0257813 | A1* | 9/2014 | Mortensen | G10L 15/02 704/251 |
| 2015/0106085 | A1* | 4/2015 | Lindahl | G06F 3/167 704/231 |
| 2015/0142438 | A1* | 5/2015 | Dai | G10L 17/02 704/246 |
| 2015/0154953 | A1* | 6/2015 | Bapat | G10L 15/06 704/251 |
| 2016/0267913 | A1* | 9/2016 | Kim | G06F 1/3215 |
| 2018/0082684 | A1* | 3/2018 | Gunn | G10L 25/87 |
| 2018/0173494 | A1* | 6/2018 | Choi | G06N 20/00 |
| 2018/0293974 | A1* | 10/2018 | Georges | G10L 15/183 |
| 2018/0342243 | A1* | 11/2018 | VanBlon | G06F 3/167 |
| 2019/0005954 | A1* | 1/2019 | Xie | G10L 15/063 |
| 2019/0027135 | A1* | 1/2019 | Kim | G06F 3/167 |
| 2019/0043481 | A1* | 2/2019 | Georges | G10L 15/063 |
| 2019/0066678 | A1* | 2/2019 | Tsukamoto | G10L 15/01 |
| 2019/0066680 | A1* | 2/2019 | Woo | G10L 15/08 |
| 2019/0073999 | A1* | 3/2019 | Premont | G10L 15/08 |
| 2019/0115025 | A1* | 4/2019 | Choi | G10L 15/00 |
| 2019/0139545 | A1* | 5/2019 | Yuan | G10L 15/08 |
| 2019/0214002 | A1* | 7/2019 | Park | G10L 15/08 |
| 2019/0214011 | A1* | 7/2019 | Shin | G10L 25/87 |
| 2019/0237071 | A1* | 8/2019 | Wang | G10L 15/30 |
| 2019/0287522 | A1* | 9/2019 | Lambourne | H04S 7/302 |
| 2019/0297407 | A1* | 9/2019 | Stanford-Jason | H04R 1/083 |
| 2019/0304449 | A1* | 10/2019 | Chang | G06F 9/4418 |
| 2020/0005789 | A1* | 1/2020 | Chae | G10L 15/30 |
| 2020/0184962 | A1* | 6/2020 | Chen | G10L 15/30 |
| 2020/0365138 | A1* | 11/2020 | Kim | G10L 13/00 |
| 2021/0210073 | A1* | 7/2021 | Shin | G06N 3/08 |
| 2021/0217403 | A1* | 7/2021 | Chae | G06N 20/00 |
| 2021/0264914 | A1* | 8/2021 | Kwon | G10L 17/22 |

FOREIGN PATENT DOCUMENTS

| | | |
|---|---|---|
| KR | 1020190014697 | 2/2019 |
| KR | 1020190022109 | 3/2019 |
| KR | 1020190023169 | 3/2019 |
| KR | 1020190064270 | 6/2019 |

* cited by examiner

METHOD AND APPARATUS FOR RECOGNIZING A VOICE

CROSS-REFERENCE TO RELATED APPLICATION

Pursuant to 35 U.S.C. § 119(a), this application claims the benefit of earlier filing date and right of priority to Korean Patent Application No. 10-2019-0073478, filed on Jun. 20, 2019, the contents of which are hereby incorporated by reference herein in its entirety.

BACKGROUND

1. Technical Field

The present disclosure relates to a speech recognition device and a speech recognition method, and more specifically, to a speech recognition device and a speech recognition method, which are capable of providing an environment that allows an additional wake-up word to be set in addition to a preset wake-up word, generates and learns various spoken utterances with respect to the additional wake-up word by using voice color conversion technology on the additional wake-up word, so as to activate a speech recognition function for accurately recognizing the contents of a voice command in response to the additional wake-up word uttered.

2. Description of the Related Art

As technology continues to advance, various services using a speech recognition technology have been introduced into numerous fields. Such a speech recognition technology can be understood as a series of processes involving understanding an utterance spoken by a person and converting the spoken utterance to textual information manageable by a computer. Likewise, speech recognition services using the speech recognition technology may include a series of processes for recognizing user's speech and providing an appropriate service corresponding to the speech.

In a speech recognition device using the speech recognition technology described above, speech recognition starts only when a designated command is inputted. Such a command that initiates the speech recognition can be referred to as a wake-up word, wherein the features relevant to the recognition of a wake-up word, since they typically pose a relatively low computational load, may be always running in the background in the speech recognition device. More specifically, the wake-up word is a word preregistered in the speech recognition device, the word which, when present in the user's spoken utterance, can be recognized by the speech recognition device to enable the speech recognition device to perform a designated task according to a subsequently inputted voice command. However, such speech recognition devices can only recognize the wake-up word preset in the device and typically cannot recognize other uttered words.

In particular, a technology that enables an electronic device to recognize user's speech signals and execute a speech recognition operation when the recognized speech signals correspond to a preset keyword (wake-up word), is disclosed in Related Art 1 and Related Art 2.

Related Art 1 discloses a technology that identifies and digitizes words to be compared to, which have similar pronunciations on the basis of phoneme edit distances in a large speech corpus or database; however, this technique may be unable to provide an environment that permits users to set an additional wake-up word of their preference in addition to a preset wake-up word.

Related Art 2 discloses a technology that with regards to processing a predefined action as a recognition result of speech signals (user's voice), extends the distance capable of recognizing the speech signals while improving the accuracy of the recognition result. However, this technique may be also unable to provide an environment permitting users to set an additional wake-up word of their preference in addition to a preset wake-up word.

The background art described above may be technical information retained by the present inventors in order to derive the present disclosure or acquired by the present inventors along the process of deriving the present disclosure, and thus is not necessarily a known art disclosed to the general public before the filing of the present application.

RELATED ART DOCUMENTS

Patent Documents

Related Art 1: Korean Patent Laid-Open Publications No. 10-2019-0023169 (published on Mar. 8, 2019)
Related Art 2: Korean Patent Laid-Open Publications No. 10-2019-0014697 (published on Feb. 13, 2009)

SUMMARY OF THE INVENTION

One aspect of the present disclosure is to provide an environment that permits the setting of an additional wake-up word in addition to a preset wake-up word, thereby addressing the shortcoming of the related art in which users are not permitted to set an additional wake-up word of their preference in addition to the preset wake-up word, thus causing those not familiar with the preset wake-up word to experience inconveniences when operating the speech recognition device.

Another aspect of the present disclosure is to provide an environment that permits the setting of a word utterance or inputted word text selected by a user as an additional wake-up word in addition to a preset wake-up word, thereby addressing the shortcoming of the related art being unable to permit the user to set an additional wake-up word of their preference.

Another aspect of the present disclosure is to provide an environment that permits a word repeatedly uttered by the user to be set as an additional wake-up word in addition to a preset wake-up word, thereby addressing the shortcoming of the related art being unable to permit the user to set an additional wake-up word of their preference.

Another aspect of the present disclosure is to provide an environment that allows the word the user repeats to be set as an additional wake-up word in addition to the preset wake-up word, using a word repeatedly uttered by the user and the results of analyzing the user's utterance environment, thereby addressing the shortcoming of the related art being unable to permit the user to set an additional wake-up word of their preference.

Another aspect of the present disclosure is to generate various spoken utterances with respect to an additional wake-up word by using voice color conversion technology on the additional wake-up word, and to learn the various spoken utterances thus generated, thereby addressing the shortcoming of the related art being unable to enable speech recognition with respect to additional wake-up words.

A speech recognition method according to an embodiment of the present disclosure provides an environment that enables the setting of an additional wake-up word in addition to a preset wake-up word, and by using a voice color conversion technology on the additional wake-up word, generates and learns various spoken utterances with respect to the additional wake-up word, such that when the additional wake-up word is uttered, wake-up word recognition is executed accurately and the speech recognition function is activated for recognizing the content of a subsequently inputted voice command.

More specifically, the speech recognition method includes setting, in addition to a preset wake-up word, an additional wake-up word target that is capable of activating speech recognition function, generating a plurality of additional wake-up word utterances formed on the basis of the additional wake-up word target being uttered under various conditions, learning a wake-up word recognition algorithm by using each of the additional wake-up word utterances to generate an additional wake-up word recognition algorithm, and executing the additional wake-up word recognition algorithm upon receiving a select word uttered by a user to determine whether to activate the speech recognition function.

Through the speech recognition method according to the present embodiment, the environment in which the additional wake-up word can be set in addition to the preset wake-up word may be provided to permit the user to set the additional wake-up word of their preference, so that even a user not familiar with the preset wake-up word can conveniently utilize the speech recognition device by setting a name they are familiar with as the wake-up word. Further, the speech recognition method according to the present embodiment may generate and learn various spoken utterances with respect to the additional wake-up word by using a voice timbre modulation technique with respect to the additional wake-up word, and thus may enable speech recognition with respect to the additional wake-up word and improve speech recognition processing performance.

In addition, setting of the additional wake-up word target may include receiving an additional wake-up word setting menu select signal, requesting the additional wake-up word to be uttered in response to the additional wake-up word setting menu select signal, receiving the uttered additional wake-up word, and setting the uttered additional wake-up word as an additional wake-up word target.

In addition, the setting of an additional wake-up word target may include receiving an additional wake-up word setting menu select signal, requesting the additional wake-up word to be uttered in response to the additional wake-up word setting menu select signal, receiving the uttered additional wake-up word, and setting the uttered additional wake-up word as the additional wake-up word target.

In addition, the setting of an additional wake-up word target may include receiving repeat utterances of a select word, and setting the select word as the additional wake-up word target if the number of the repeat utterances of the select word is greater than or equal to a preset reference number.

In addition, setting of the additional wake-up word target may include receiving repeat utterances of the select word, analyzing an utterance environment of the select word, and setting the select word as the additional wake-up word target if the number of the repeat utterances of the select word is greater than or equal to a preset reference number and the utterance environment of the select word satisfies a preset condition.

In addition, analyzing of the utterance environment may include at least one selected from receiving and analyzing a captured image of the utterance environment of the select word and analyzing a calculation result of a distance between the user uttering the select word and the speech recognition device.

In addition, setting of the additional wake-up word target may include determining that the utterance environment of the select word satisfies the preset condition and setting the select word as the additional wake-up word target if the number of the repeat utterances of the select word is greater than or equal to the preset reference number and a facial direction of the user in the image is toward the speech recognition device.

In addition, setting of the additional wake-up word target may include determining that the utterance environment of the select word satisfies the preset condition and setting the select word as the additional wake-up word target if the number of the repeat utterances of the select word is greater than or equal to the preset reference number and the distance between the user uttering the select word and the speech recognition device is within a preset reference distance.

In addition, in spite of the speech recognition device being a mass-produced uniform product, setting of the additional wake-up word target as described in the present embodiment may create the effect of a customized product, allowing a user to perceive their speech recognition device as a personalized device, and, may further increase customer satisfaction and enable rapid and accurate speech recognition processing in various services provided through speech recognition.

In addition, generating of the plurality of utterance data items may include generating a plurality of voice data items with respect to the additional wake-up word target by using pre-existing database of voice feature parameters, and adding noises to the plurality of voice data items.

Through generating of the plurality of utterance data items as described in the present embodiment, various spoken utterances with respect to the additional wake-up word may be generated to enable speech recognition with respect to the additional wake-up word, producing improvements in speech recognition processing performance.

The speech recognition method according to an embodiment of the present disclosure includes a setter configured to set an additional wake-up word target capable of activating speech recognition function in addition to a preset wake-up word, a first generator configured to generate a plurality of utterance data items with respect to the additional wake-up word target, formed on the basis of the additional wake-up word target being uttered under various conditions, a second generator configured to learn/train a wake-up word recognition algorithm by using each of the plurality of utterance data items as training input data and generate an additional wake-up word recognition algorithm, and a determiner configured to execute the additional wake-up word recognition algorithm upon receiving a select word uttered by a user and determine whether to activate the speech recognition function.

The speech recognition device according to the present embodiment, by providing an environment where an additional wake-up word can be set in addition to a preset wake-up word, may permit users, including those that are not familiar with the preset wake-up word, to set a name they are more familiar with as a wake-up word, thus allowing them to utilize the speech recognition device conveniently; and by using voice color conversion technology on the additional wake-up word, may generate various spoken utterances with respect to the additional wake-up word and learn the various spoken utterances generated, to enable speech recognition with respect to the additional wake-up word, resulting in improvements in speech recognition processing performance.

In addition, the setter may include a first processor configured to request an additional wake-up word utterance in response to an additional wake-up word setting menu select signal and receive the additional wake-up word utterance, and a first setter configured to set the additional wake-up word utterance as an additional wake-up word target.

In addition, the setter may include a first processor configured to request input of an additional wake-up word text in response to an additional wake-up word setting menu select signal and receive the additional wake-up word text, and a first setter configured to set the additional wake-up word text as an additional wake-up word target.

In addition, the setter may include a second processor configured to receive repeat utterances of a select word, and a second setter configured to set the select word as an additional wake-up word target if the number of the repeat utterances of the select word is greater than or equal to a preset reference number.

In addition, the setter may include a second processor configured to receive repeat utterances of a select word, an analyzer configured to analyze an utterance environment of the select word, and a second setter configured to set the select word as an additional wake-up word target if the number of the repeat utterances of the select word is greater than or equal to a preset reference number and an utterance environment of the select word satisfies a preset condition.

In addition, the analyzer may receive a captured image of the utterance environment of the select word and analyze the same or may analyze the calculation result of a distance between the user uttering the select word and the speech recognition device.

In addition, if the number of the repeat utterances of the select word is greater than or equal to the preset reference number and the facial direction of the user in the image is toward the speech recognition device, the second setter may determine that the utterance environment of the select word satisfies the preset condition and set the select word as the additional wake-up word target.

In addition, the second setter may determine that the utterance environment of the select word satisfies the preset condition if the number of the repeat utterances of the select word is greater than or equal to the preset reference number and the distance between the user uttering the select word and the speech recognition device is within a preset reference distance; and may set the select word as the additional wake-up word target.

In spite of the speech recognition device being a mass-produced uniform product, the second setter according to the present embodiment may create the effects of being a customized product, allowing the user to perceive their speech recognition device as a personalized device, and may further increase customers' satisfaction and perform rapid and accurate speech recognition processing in various services provided through speech recognition.

In addition, the first generator may generate a plurality of voice data items with respect to the additional wake-up word target by using pre-existing database of voice feature parameters and may add noises to the plurality of voice data items.

Through the first generator according to the present embodiment, various spoken utterances may be generated with respect to the additional wake-up word to enable speech recognition with respect to the additional wake-up word, thus producing improvements in speech recognition processing performance.

Other than the aforementioned, there may be provided processes and systems for implementing the present disclosure, and computer programs for implementing such processes.

According to the present disclosure, by expanding an environment capable of setting additional wake-up words other than a preset wake-up word so as to permit a user to set an additional wake-up word of their preference in addition to the preset wake-up word, it is possible to allow users, including those that are not familiar with the preset wake-up word, to set a name they are more comfortable with as the wake-up word and thereby more conveniently utilize the speech recognition device.

Further, by using voice color conversion technology on the additional wake-up word, various spoken utterances of the additional wake-up word may be generated and learned to enable speech recognition with respect to the additional wake-up word, producing improvements in speech recognition processing performance.

Furthermore, the speech recognition device, in spite of being a mass-produced uniform product itself, may permit the user to perceive the speech recognition device as a personalized device, thus creating the effects of a customized product.

In addition, the present disclosure may increase customers' satisfaction in various services provided through speech recognition and may perform rapid and accurate speech recognition processing.

In addition, voice commands intended by the user may be recognized and processed by using optimal processor resources, thus increasing the energy efficiency of the speech recognition device.

Advantages and features of the present disclosure and methods for achieving them will become apparent from the descriptions of aspects herein below with reference to the accompanying drawings. However, the present disclosure is not limited to the aspects disclosed herein but may be implemented in various different forms.

BRIEF DESCRIPTION OF DRAWINGS

The above and other aspects, features, and advantages of the present disclosure will become apparent from the detailed description of the following aspects in conjunction with the accompanying drawings, in which.

DETAILED DESCRIPTION OF THE INVENTION

Figure 1:
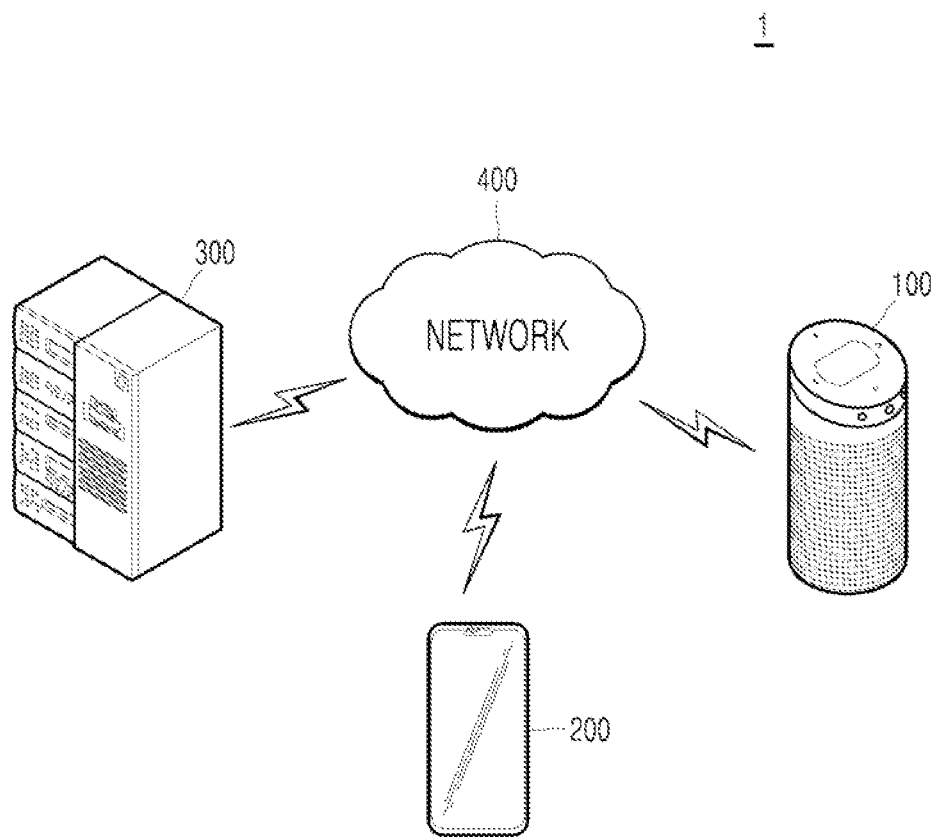
FIG. 1 is a diagram illustrating a speech recognition environment according to an embodiment of the present disclosure, including a speech recognition device, a user terminal, a server, and a network connecting the speech recognition device, the user terminal, and the server to one another.

Advantages and features of the present disclosure and methods of achieving the advantages and features will be more apparent with reference to the following detailed description of embodiments in connection with the accompanying drawings. However, the description of particular embodiments is not intended to limit the present disclosure to the particular embodiments disclosed herein, but on the contrary, it should be understood that the present disclosure is to cover all modifications, equivalents and alternatives falling within the spirit and scope of the present disclosure. The embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification in so much as such details are not necessary to obtain a complete understanding of the present disclosure.

The terminology used herein is used for the purpose of describing particular embodiments, and is not intended to limit the scope of the present disclosure. It must be noted that as used herein and in the appended claims, the singular forms "a," "an," and "the" include the plural references unless the context clearly dictates otherwise. It should be understood that the terms "comprises," "comprising," "includes," "including," "containing," "has," "having" or any other variation thereof specify the presence of stated features, integers, steps, operations, elements, components, or a combination thereof, but do not preclude the presence or addition of one or more other features, integers, steps, operations, elements, components, or a combination thereof. Furthermore, these terms such as "first," "second," and other numerical terms may be used herein only to describe various elements, but these elements should not be limited by these terms. Furthermore, these terms such as "first," "second," and other numerical terms, are used only to distinguish one element from another element.

Hereinbelow, the embodiments of the present disclosure will be described in greater detail with reference to the accompanying drawings, and on all these accompanying drawings, the identical or analogous elements are designated by the same reference numeral, and repeated description of the common elements will be omitted.

FIG. 1 is a diagram illustrating a speech recognition environment according to an embodiment of the present disclosure, including a speech recognition device, a user terminal, a server, and a network connecting the speech recognition device, the user terminal, and the server to one another.

FIG. 1 illustrates a state in which a speech recognition device 100, a user terminal 200, and a server 300 are communicatively connected to one another via a network 400. The speech recognition device 100 includes a communicator (110 in FIG. 3) that enables transmission/reception of data with the server 300 and the user terminal 200 corresponding to a personal communication device via the network 400 which may be wire-based or wireless.

The speech recognition device 100, the user terminal 200, and the server 300 may be connected to one another in a 5G communication environment. In addition to the ones illustrated in FIG. 1, various other electronic devices, which can be used at home or office, may be connected to one another and operated in an Internet-of-Things environment.

The speech recognition device 100 may receive, recognize, and analyze a spoken utterance from a user and provide a speech recognition service. The speech recognition device 100 may include an artificial intelligence (AI) speaker and act as a hub controlling an electronic device that does not have speech input/output functionality.

Here, the spoken utterance may contain a wake-up word and a spoken sentence. The wake-up word is a designated command that activates the speech recognition function of the speech recognition device 100 and is herein referred to as "wake-up word". The speech recognition function is activated only when the wake-up word is present in the spoken utterance, and therefore, when the spoken utterance does not contain the wake-up word, the speech recognition function remains inactive (for example, in a sleep mode). Such a wake-up word may be preset and stored in a memory (160 in FIG. 3) that will be described later. Furthermore, an additional wake-up word is a wake-up word directly set by a user in addition to a preset wake-up word and is capable of serving the same function as the preset wake-up word.

In addition, a spoken sentence refers to the portion of a spoken utterance that is processed after the speech recognition function is activated and may include a voice command that the speech recognition device 100 can actually process and generate an output from. For example, when the user's spoken utterance is "Eeoseutaya eeokeoneul kyeojwo (Airstar, turn on the air conditioner)", the wake-up word in this case would be "Eeoseutaya (Airstar)", and the spoken sentence would be "eeokeoneul kyeojwo (turn on the air conditioner)". In this case, the speech recognition device 100 may receive and analyze the spoken utterance, determine whether the wake-up word is present therein, and execute the spoken sentence, thereby controlling an air conditioner (not illustrated) as an electronic device.

In the present embodiment, the speech recognition device 100 may set an additional wake-up word in addition to the preset wake-up word, the additional wake-up word being capable of activating the speech recognition function, and may generate a plurality of utterance data items with respect to an additional wake-up word target being uttered under different conditions. The speech recognition device 100 may learn a wake-up recognition algorithm by using each of the plurality of utterance data items as training input data and generate an additional wake-up word recognition algorithm, and furthermore, the speech recognition device 100 may execute the additional wake-up word recognition algorithm upon receiving a select word uttered by a user and determine whether to activate the speech recognition function. When the select word uttered by the user is the preset wake-up word or the additional wake-up word, the speech recognition device 100 may execute the additional wake-up word recognition algorithm and activate the speech recognition function for recognizing a spoken sentence.

The speech recognition device 100 may provide an additional wake-up word setting menu in order to set an additional wake-up word target, and may request an additional wake-up word utterance or an input of additional wake-up word text in response to an additional wake-up word setting menu select signal from the user, and may receive the additional wake-up word utterance or text, and set the same as an additional wake-up word target.

In some embodiments, the speech recognition device 100 may receive repeated utterances of a select word, and may set the select word as an additional wake-up word target if the number of the repeated utterances of the select word is equal to or greater than a preset reference number.

In some embodiments, the speech recognition device 100 may receive a number of repeated utterances of a select word and analyze an utterance environment of the select word, and if the number or repeated utterances of the select word is equal to or greater than the select word and the utterance environment of the select word satisfies a preset condition, the speech recognition device 100 may select the select word as the additional wake-up word target.

The user terminal 200 may control driving of the speech recognition device 100 through the server 300. Furthermore, the user terminal 200 may receive, from the speech recognition device 100, various messages regarding an operation of the speech recognition device 100. The type of such messages include, but are not limited to, a notification message indicating the start and/or end of speech recognition processing of the speech recognition device 100, an alarm message indicating an occurrence of abnormal situation within the speech recognition device 100, and so forth. These notification message and/or alarm message may be transmitted and outputted simultaneously through a user interface (not illustrated) of the speech recognition device 100 and the user terminal 200.

The user terminal 200 may include a communication terminal capable of performing functions of a computing device (not illustrated), and may include, but is not limited to, a user-operable desktop computer, a smartphone, a notebook computer, a tablet PC, a smart TV, a mobile phone, a personal digital assistant (PDA), a laptop computer, a media player, a micro server, a global positioning system (GPS) device, an E-book reader, a digital broadcasting terminal, a navigation system, a kiosk information system, an MP3 player, a digital camera, a home appliance, and any other mobile or immobile computing devices. In addition, the user terminal 200 may be a wearable terminal implemented with communication function and data processing function, in the form of a watch, glasses or goggles, a hairband, a ring, or the like. The user terminal 200 is not limited to the aforementioned items, but may be any terminal capable of web-browsing.

The server 300 may be a database server which provides big data required for applications of various artificial intelligence algorithms, data on speech recognition, and the like. Furthermore, the server 300 may include a web server or application server that enables remote control of the speech recognition device 100 by using an application or web browser installed on the user terminal 200.

Artificial intelligence (AI) is an area of computer engineering and information technology that studies how to make computers perform things humans are capable of doing with human intelligence, such as reasoning, learning, self-improving, and the like, or how to make computers mimic such intelligent human behaviors.

In addition, AI does not exist on its own, but is rather directly or indirectly related to a number of other fields in computer science. Particularly in recent years, there have been numerous attempts to introduce an element of AI into various fields of information technology to solve problems of the respective fields.

Machine learning is an area of artificial intelligence that includes the field of study that gives computers the capability to learn without being explicitly programmed. More specifically, machine learning is a technology that investigates and builds systems, and algorithms for such systems, that are capable of learning, making predictions, and enhancing its own performance on the basis of experiential data. Machine learning algorithms, rather than executing rigidly set static program commands, may take an approach that builds a specific model based on input data for deriving a prediction or decision.

The server 300 may set a user's uttered word received from the speech recognition device 100 as an additional wake-up word target capable of activating the speech recognition function in addition to a preset wake-up word. Subsequently, the server 300 may generate a plurality of utterance data items with respect to the additional wake-up word target being uttered under differing conditions, and by using each of the plurality of utterance data items as training input data, the server 300 may learn a wake-up word recognition algorithm and generate an additional wake-up word recognition algorithm. Here, the training input data may include a plurality of utterance data items with respect to an additional wake-up word target labeled with a name corresponding to the additional wake-up word target.

The speech recognition device 100, upon receiving the select word uttered by a user, determines whether to activate the speech recognition function by executing the additional wake-up word recognition algorithm through the server 300, and the server 300, by executing the additional wake-up word algorithm, may send to the speech recognition device 100 a command to activate the speech recognition function for recognizing a spoken sentence. In other words, speech recognition processing processes may be executed by the server 300.

Depending on processing capability of the speech recognition device 100, at least part of setting the wake-up word, generating the algorithm for recognizing the additional wake-up word, determining whether to activate the speech recognition function, and the spoken sentence recognition, as described previously, may be performed by the speech recognition device 100.

The network 400 may serve to connect the speech recognition device 100 and the user terminal 200 to each other. The network 400 includes, but is not limited to, wire-based networks such as LANs (local area networks), wide area networks (WANs), metropolitan area networks (MANs), and integrated service digital networks (ISDNs); or wireless networks such as wireless LANs, CDMA, Bluetooth communications, satellite communications, and so forth. In addition, the network 400 may transmit or receive data using short-range communication and/or long-range communication technologies. Examples of the short-range communication technologies may include Bluetooth, radio frequency identification (RFID), infrared data association (IrDA), ultra-wideband (UWB), ZigBee, and wireless fidelity (Wi-Fi). Examples of the long-range communication technologies may include code division multiple access (CDMA), frequency division multiple access (FDMA), time division multiple access (TDMA), orthogonal frequency division multiple access (OFDMA), and single carrier frequency division multiple access (SC-FDMA).

Figure 2:
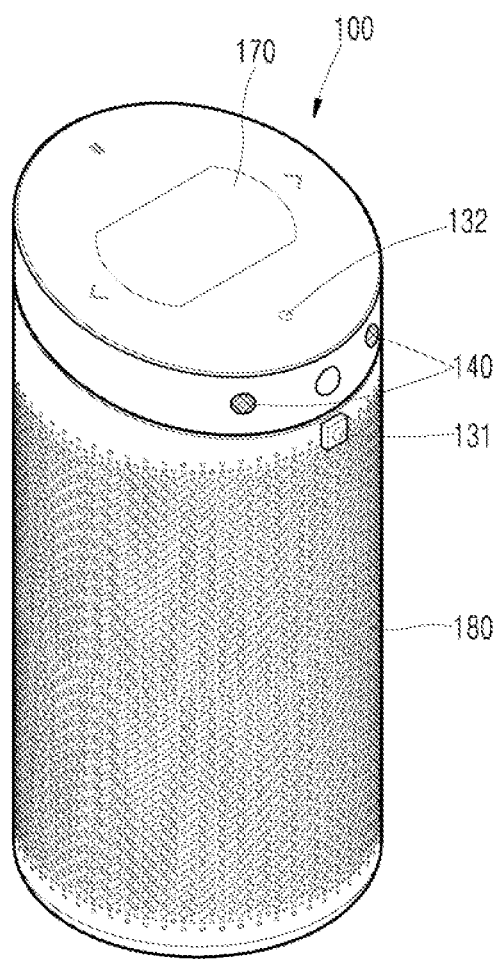
FIG. 2 is a diagram showing an example of the outer appearance of a speech recognition device according to an embodiment of the present disclosure.
Figure 3:
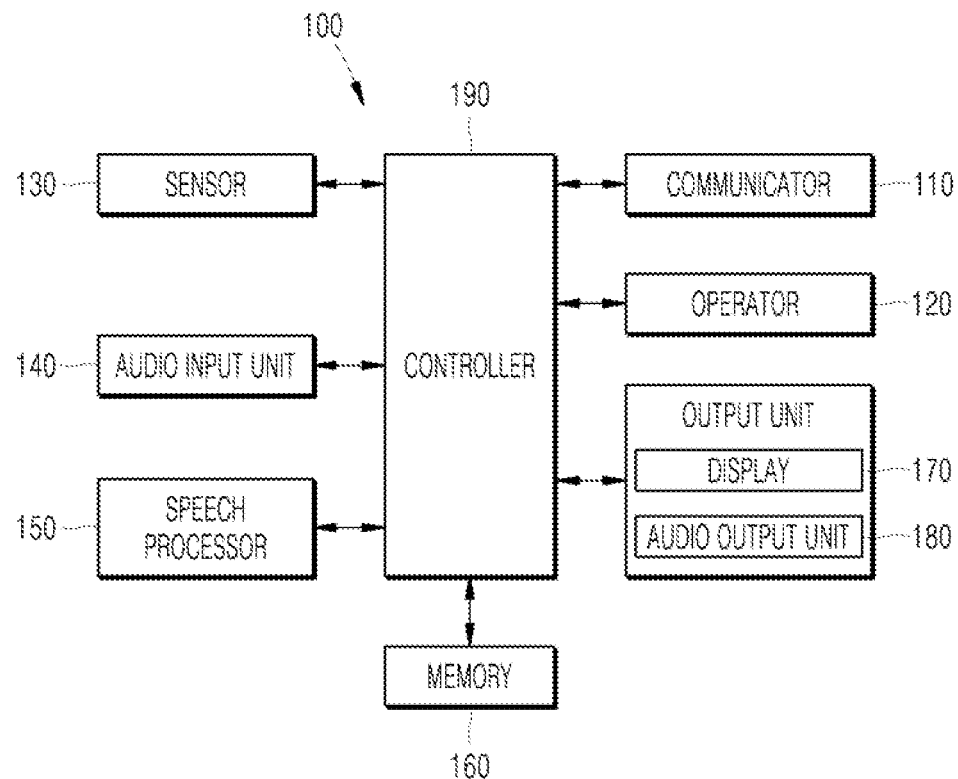
FIG. 3 is a schematic block diagram of a speech recognition device according to an embodiment of the present disclosure.

The network 400 may include connections of network elements, such as hubs, bridges, routers, switches, gateways, and so forth. The network 400 may include a public network such as the Internet, and a private network such as an organization's secured private network, and may also include one or more connected networks as in a multi-network condition. Access to the network 400 may be provided through one or more wire-based or wireless access networks. Furthermore, the network 400 may support Internet of Things (IoT) network FIG. 2 is a diagram illustrating an external appearance of a speech recognition device according to an example embodiment of the present disclosure, and FIG. 3 is a block diagram schematically illustrating a speech recognition device according to an example embodiment of the present disclosure. Hereinbelow, the common parts previously described with reference to FIG. 1 will be not be described to avoid repetitive description. Referring to FIG. 2 and FIG. 3, the speech recognition device 100 may include a communicator 110, an operator 120, a sensor 130 including a proximity sensor 131 and an image sensor 132, an audio input unit 140, a speech processor 150, a memory 160, a display 170, an audio output unit 180, and a controller 190.

The communicator 110 may provide in connection with the network 400 a communication interface required to provide, as packet data, transmission/reception signals between the voice recognition device 100 and another electronic device and/or a user terminal 200. Furthermore, the communicator 110 may receive a predetermined information request signal from the electronic device and/or the user terminal 200, and may transmit information processed by the speech recognition device 100 to the electronic device and/or the user terminal 200. The communicator 110 may be a device that includes hardware and software required for transmission/reception of signals such as control signals, data signals, and so forth, with other network devices through wire-based or wireless connections.

In the present embodiment, the another network device may refer to a home appliance not provided with voice input/output functionality, for example, an air conditioner, a refrigerator, a laundry machine, or the like, and this home appliance may be controlled using the speech recognition device 100. Further, the another electronic device may be a home appliance provided with voice input/output functionality, that is, a function of the speech recognition device 100.

The operator 120 may have a plurality of operable buttons (not illustrated) and may transmit a signal corresponding to an operated button to the controller 190. In the present example embodiment, the operator 120 may include first to fourth contact switches (not illustrated) and an exact process of processing an output signal of each contact switch may be determined by a program previously stored in the memory 160. For example, by an operation signal of the first contact switch or the second contact switch, menu items horizontally displayed on the display 170 may be selected; and by an operation signal of the third contact switch or the fourth contact switch, menu items vertically displayed on the display 170 may be selected. In addition, the speech recognition function may be activated by operating one of the first to fourth contact switches.

For example, the operator 120 may further include a text input unit (for example, a keyboard) to which an additional wake-up word text is to be inputted to set an additional wake-up word. When an additional wake-up word setting menu is displayed on the display 170 by the operation of a contact switch, the user may call the text input unit to set the additional wake-up word, and the controller 190 may display the text input unit on the display 170 in response to a call signal. The additional wake-up word text inputted through the operator 120 may be stored in the memory 160.

The sensor 130 may include the image sensor 132 and the proximity sensor 131 configured to sense an environment around the speech recognition device 100. The proximity sensor 131 may acquire data on the location of an object (for example, a user) located around the speech recognition device 100 by using far-infrared rays or the like. Furthermore, user location data acquired by the proximity sensor 131 may be stored in the memory 160.

The image sensor 132 may include a camera (not illustrated) capable of capturing an image of the surrounding of the speech recognition device 100, and for image-capturing efficiency, a plurality of cameras may be provided therein. For example, each camera may include an image sensor (for example, a CMOS image sensor) which includes at least one optical lens and a plurality of photodiodes (for example, pixels) forming an image using the light passed through the optical lens, and may include a digital signal processor (DSP) for forming an image based on signals outputted from the photodiodes. The digital signal processor may generate not only a static image, but also a dynamic image formed of frames of static images. Meanwhile, the image captured and acquired by the camera serving as the image sensor 132 may be stored in the memory 160.

Although the sensor 130 is limited to the proximity sensor 131 and the image sensor 132 in the present example embodiment, the sensor 130 may also include various other sensors, such as a temperature sensor, a humidity sensor, a vibration sensor, etc., each capable of sensing a condition around the voice recognition device 100. Furthermore, information detected by the sensor 130 may be stored in the memory 160.

The audio input unit 140 may have inputted thereto a spoken utterance uttered by a user towards the voice recognition device 100. To this end, the audio input unit 140 may be provided with one or more microphones (not illustrated). In addition, to enable more accurate reception of the spoken utterance, the audio input unit 140 may be provided with a plurality of microphones (not illustrated). Here, the plurality of microphones may be disposed in different locations by being spaced apart from each other, and may process the received spoken utterance into electrical signals.

In some embodiments, the audio input unit 140 may use various noise removing algorithms for removing the noise generated during the process of receiving the spoken utterance. In some embodiments, the audio input unit 140 may include various components for processing audio signals. For example, the audio input unit 140 may include a filter (not illustrated) which removes noise when receiving a spoken utterance, an amplifier (not illustrated) which amplifies signals outputted from the filter and outputs the same (the amplified signals), and the like.

The speech processor 150 may set, in addition to a preset wake-up word, an additional wake-up word target capable of activating speech recognition function, and may generate a plurality of additional wake-up word utterances on the basis of the additional wake-up word target being uttered under various conditions. The speech processor 150 may learn a wake-up recognition algorithm by using each of the plurality of utterances of the additional wake-up word as training input data, and thereby generate an additional wake-up word recognition algorithm, and furthermore, upon receiving a select word uttered by the user, the additional wake-up word recognition algorithm may be executed to determine whether to activate the speech recognition function. The speech processor 150, by executing the additional wake-up word recognition algorithm, when the select word uttered by the user is the preset wake-up word or the additional wake-up word, may activate the speech recognition function for recognizing a spoken sentence under control of the controller 190. Hereinbelow, the speech processor 150 will be described in greater detail with reference to FIG. 4 and FIG. 6.

The memory 160 may include a volatile or non-volatile recording medium and have recorded various data required for operations of the speech recognition device 100. The recording medium is configured to store data readable by the controller 190, and may include a hard disk drive (HDD), solid state disk (SSD), silicon disk drive (SDD), ROM, RAM, CD-ROM, a magnetic tape, a floppy disk, a light data storage device, and the like.

Meanwhile, the memory 160 may store data for speech recognition, and through the additional wake-up word recognition algorithm executed by the speech processor 150 in response to the select word uttered by the user, when the select word uttered by the user is the preset wake-up word or the additional wake-up word, the controller 190 may control to activate the speech recognition function for recognizing a spoken sentence and to output results of processing the spoken sentence. By the additional wake-up word recognition algorithm executed by the speech processor 150 in response to the select word uttered by the user, when the select word uttered by the user is not the preset wake-up word or the additional wake-up word, the controller 190 may hold the speech recognition function in an inactive state.

Here, relatively simple speech recognition may be performed by the speech recognition device 100 while relatively more advanced speech recognition, such as natural language processing, may be performed on the server 300. For example, in a case when the word uttered by the user is the preset wake-up word or the additional wake-up word, the speech recognition device 100 may switch to the state for receiving a spoken sentence as voice command. Here, the speech recognition device 100 may perform the speech recognition method up to determining whether or not the wake-up word is inputted, and the speech recognition method subsequent thereto involving the contents of a voice command of the inputted spoken utterance may be performed through the server 300. Given that the system resources of the speech recognition device 100 are limited, complex natural language recognition and processing may be performed through the server 300.

The memory 160 may store limited data. For example, a preset wake-up word for determining the presence of a wake-up word in the spoken utterance may be stored in the memory 160. The wake-up word may be set by the manufacturer. For example, "Eeoseuta (Airstar)" may be set as the wake-up word and stored. In addition, the additional wake-up word deliberately set by a user may be stored.

The processing results of a spoken sentence processed by the controller 190 may be outputted through an output unit, and the output unit may include a display 170 and an audio output unit 180. The display 170 may display, as image, processing results, operation mode, operation status, error status, etc. corresponding to the spoken sentence within the spoken utterance. In some embodiments, the display 170 may include a touchscreen which forms an interlayer structure with a touchpad. In this case, the display 170 may be utilized, not only as an output device, but also as an input device to which data can be inputted by a user's touch.

The display 170 may display a driving mode, a current state, and setting items of the speech recognition device 100, through various visual images, letters, numerals, and symbols, as well as through graphic images such as icons. In addition, the display 170 may display information corresponding to each stage involved in the process of processing the inputted spoken utterance.

The audio output unit 180 may output an audio signal. For example, under control of the controller 190, the audio output unit 180 may output, as audio, an alarm sound, notification messages regarding an operation mode, an operation status, an error status, etc., information corresponding to user's spoken sentence, processing results corresponding to user's spoken sentence, and the like. The audio output unit 180 may convert electric signals from the controller 190 into audio signals and output the converted audio signals. To this end, the audio output unit 180 may be provided with a speaker (not illustrated) or the like.

The controller 190 may control the display 170 to provide visual information corresponding to each stage of the speech recognition method and the process of controlling the electronic device, and may control the audio output unit 180 to provide audio information corresponding to each stage of the speech recognition method and the process of controlling the electronic device. In the present embodiment, the controller 190 may control to output the processing results of a spoken sentence isolated by the speech processor 150 through the display 170 and/or the audio output unit 180.

The controller 190 may be a central processor of a kind capable of driving a control software installed in the memory 160, controlling the display 170 and/or the audio output unit 180 to output the processing results of a spoken sentence, and other various functions. Here, the controller 190 may include a device of any kind capable of processing data, such as a processor. Here, the 'processor' may refer to a data processing device built in a hardware, which includes physically structured circuits in order to perform functions represented as a code or command contained in a program. Examples of the data processing device built in a hardware include, but are not limited to, processing devices such as a microprocessor, a central processor (CPU), a processor core, a multiprocessor, an application-specific integrated circuit (ASIC), a field programmable gate array (FPGA), and the like.

In the present example embodiment, the speech recognition device 100 may perform machine learning, such as deep learning, on received user's additional wake-up word, and the memory 160 may store data to be used in machine learning, result data, and the like.

Deep learning, which is a subfield of machine learning, enables data-based learning through multiple layers. As the number of layers in deep learning increases, the deep learning network may represent a collection of machine learning algorithms that extract core data from a plurality of data sets.

Deep learning structures may include an artificial neural network (ANN), and may include a convolutional neural network (CNN), a recurrent neural network (RNN), a deep belief network (DBN), and the like. The deep learning structure according to the present example embodiment may use various structures well known in the art. For example, the deep learning structure according to the present disclosure may include a CNN, an RNN, a DBN, and the like. RNN is an artificial neural network structure which is formed by building up layers at each instance, and which is heavily used in natural language processing and the like and effective for processing time-series data which vary over a course of time. DBN includes a deep learning structure formed by stacking up multiple layers of restricted Boltzmann machines (RBM), which is a deep learning scheme. Once a certain number of layers are stacked by repeating RBM training, a DBN having this number of layers can be formed. CNN includes a model mimicking a human brain function, built on the assumption that when a person recognizes an object, the brain extracts basic features of the object and recognizes the object based on the results of complex processing in the brain.

Further, the artificial neural network may be trained by adjusting weights of connections between nodes (if necessary, adjusting bias values as well) so as to produce a desired output from a given input. In addition, the artificial neural network can continuously update the weight values through training. Furthermore, methods such as back propagation may be used in training the artificial neural network.

Meanwhile, the speech recognition device 100 may be provided with an artificial neural network and perform machine learning-based user recognition and user's voice color recognition, which use received audio input signals as input data.

The controller 190 may include an artificial neural network, for example, a deep neural network (DNN) such as CNN, RNN, DBN, and the like, and may train the DNN. As a machine learning method for such an artificial neural network, both unsupervised learning and supervised learning may be used. The controller 190 may control such that an artificial neural network structure associated with voice color recognition is updated after training according to settings.

Figure 4:
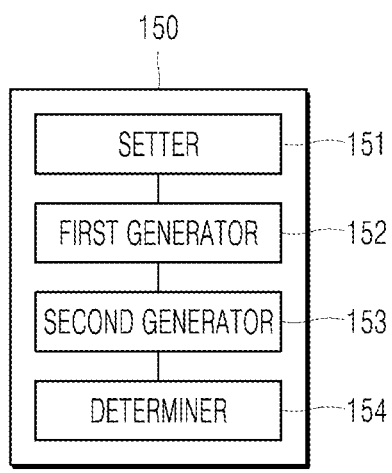
FIG. 4 is a schematic block diagram of a voice processor of the speech recognition device shown in FIG. 3.
Figure 5:
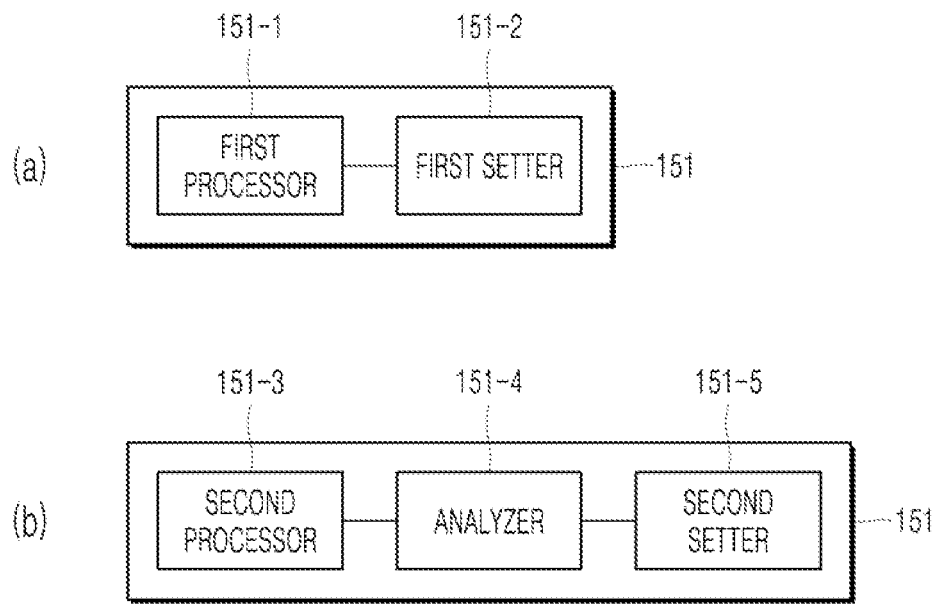
FIG. 5 is a schematic block diagram of a setter according to an embodiment of the voice processor shown in FIG. 4.

FIG. 4 is a schematic block diagram of a voice processor of the speech recognition device shown in FIG. 3 according to an embodiment, and FIG. 5 is a schematic block diagram of a first generator of the speech recognition device shown in FIG. 3 according to an embodiment. Hereinbelow, a repetitive description of the common parts previously described with reference to FIG. 1 to FIG. 3 will be omitted. Referring to FIG. 4, the speech processor 150 according to an embodiment may include the setter 151, the first generator 152, the second generator 153, and the determiner 154.

In addition to a preset wake-up word, the setter 151 may set an additional wake-up word target that is capable of activating a speech recognition function. In the present embodiment, the setter 151 may provide various environments where the additional wake-up word can be set. FIG. 5a is a schematic block diagram of a setter 151 according to an embodiment, which includes a first processor 151-1 and a first setter 151-2, and FIG. 5b is a schematic block diagram of a setter 151 according to another embodiment, which may include a second processor 151-3, an analyzer 151-4, and a second setter 151-5.

Referring to FIG. 5a, the first processor 151-1 may request an additional wake-up word utterance in response to an additional wake-up word setting menu select signal from the user, and may receive the additional wake-up word uttered by the user.

The user may summon an additional wake-up word setting menu by operating a contact switch included in the operator 120 on the display 170, and under control of the controller 190, the first processor 151-1 may drive the audio input unit 140 and request an additional wake-up word utterance. Here, the request for the additional wake-up word utterance may be outputted as visual information (for example, text and/or graphic) through the display 170 and/or outputted through the audio output unit 180 as audio information. The first processor 151-1 may receive spoken utterances with respect to the additional wake-up word from the user through the audio input unit 140.

The first setter 151-2 may receive the additional wake-up word utterance from the first processor 151-1, convert the additional wake-up word utterance to text, set the additional wake-up word text as an additional wake-up word, and store the set additional wake-up word in the memory 160 under control of the controller 190. Once the additional wake-up word is stored in the memory 160, the controller 190 may control the first processor 151-1 to output an additional wake-up word setting complete signal through the display 170 and/or the audio output unit 180, and may end the additional wake-up word select menu. In the present embodiment, the additional wake-up word may include a plurality of additional wake-up words as desired by the user.

In some embodiments, the first processor 151-1 may request an input of the additional wake-up word text in response to an additional wake-up word setting menu select signal from the user and receive the additional wake-up word text inputted by the user.

The user may summon an additional wake-up word setting menu by operating a contact switch included in the operator 120 on the display 170, and under control of the controller 190, the first processor 151-1 may display a text input unit on the display 170 and request input of additional wake-up word text. Here, the request for input of the additional wake-up word text may be outputted as visual information (for example, text and/or graphic) through the display 170 and/or outputted through the audio output unit 180 as audio information. The first processor 151-1 may receive the additional wake-up word text inputted from the user through the audio input unit 140.

The first setter 151-2 may receive the additional wake-up word text from the first processor 151-1, set the additional wake-up word text as an additional wake-up word, and store the set additional wake-up word in the memory 160 under control of the controller 190. Once the additional wake-up word is stored in the memory 160, the controller 190 may control the first processor 151-1 to output an additional wake-up word setting complete signal through the display 170 and/or the audio output unit 180, and may end the additional wake-up word select menu.

Referring to FIG. 5b, the second processor 151-3 may receive repeat utterances of the select word from the user, regardless of user's selection on the additional wake-up word setting menu. Here, the select word may be a word different from the preset wake-up word. For example, when the preset wake-up word is 'Hi LG', the user may repeatedly call the speech recognition device 100 by a name with which the user feels more comfortable, such as 'Speaker'.

The second setter 151-5 may set the select word uttered by the user as an additional wake-up word target if the number of the repeat utterances of the select word by the user is greater than or equal to a preset reference number (for example, three times).

In some embodiments, the second setter 151-5 may set a select word uttered by the user as an additional wake-up word target if the number of repeat utterances of the select word by the user is greater than or equal to a reference number, and also if such an instance is repeated a reference number of times (for example, five times) or more in discrete time windows from one other.

In some embodiments, the second processor 151-3 may receive repeat utterances of the select word from the user, regardless of user's selection on the additional wake-up word setting menu. The analyzer 151-4 may analyze an environment in which the user utters the select word. If the number of repeat utterances of the word is greater than or equal to a preset reference number and the utterance environment of the word satisfies a preset condition, the second setter 151-5 may set the word as an additional wake-up word target. Here, the preset condition may include a facial direction of the user and information on a distance between the user and the speech recognition device 100. This is based on the tendency of users to usually turn their face toward the speech recognition device 100 or approach the speech recognition device 100 when they utter a wake-up word to drive the speech recognition device 100.

In the present embodiment, the analyzer 151-4 may receive a video filmed by an image sensor 132, that is, a camera, the image of the user repeatedly uttering a select word, and may analyze whether the facial direction of the user's face is toward the speech recognition device 100, more specifically, whether the facial direction of the user's face corresponds, within a margin of error, to a direction in which the speech recognition device 100 is located. Further, the analyzer 151-4 may analyze a result calculated by the proximity sensor 131 of a distance between the user uttering the word and the speech recognition device 100. The analyzer 151-4 may analyze a calculation result of a distance between the user and the speech recognition device 100 by analyzing a difference between time information with regard to the proximity sensor 131 sending a signal and time information with regard to the time it takes for the sent signal to be reflected off of the user and come back.

If the number of the repeat utterances of the select word is greater than or equal to a preset reference number and the utterance environment of the select word satisfies a preset condition, the second setter 151-5 may determine that the utterance environment of the select word satisfies a preset condition and proceed to set the select word as the additional wake-up word target. In addition, if the number of the repeat utterances of the select word is greater than or equal to a preset reference number and the distance between the user and the speech recognition device 100 is within a preset reference distance (for example, one meter), the second setter 151-5 may determine that the utterance environment of the select word satisfies a preset condition and proceed to set the select word as the additional wake-up word target.

Figure 6:
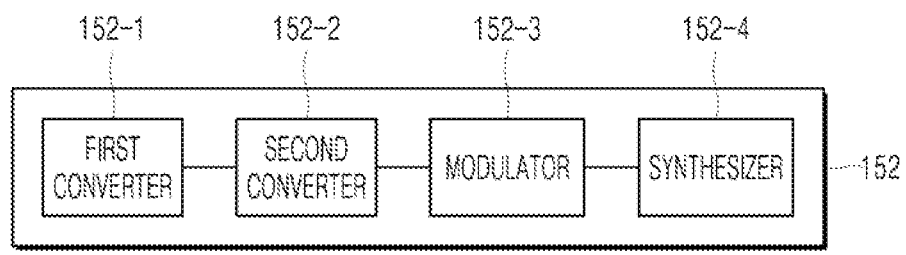
FIG. 6 is a schematic block diagram of a first generator according to an embodiment of the voice processor shown in FIG. 4.

Coming back to FIG. 4, the first generator 152 may generate a plurality of utterance data items with respect to the additional wake-up word on the basis of the additional wake-up word target being uttered under various conditions. FIG. 6 is a schematic block diagram of the first generator 152 according to an embodiment, which may include a first converter 152-1, a second converter 152-2, a modulator 152-3, and a synthesizer 152-4.

The first converter 152-1 may convert an utterance data item with respect to the additional wake-up word uttered by the user to text. In the present embodiment, when an utterance data item with respect to the additional wake-up word is in a textual form, the operation of the first converter 152-1 may be excluded.

The second converter 152-2 may analyze the syntactic structure of the utterance data text with respect to the additional wake-up word received from the first converter 152-1 and generate prosody, and may collect base units of voice database stored according to the generated prosody and convert the same to the utterance data voice.

The modulator 152-3, by using speech features stored in the memory 160, may modulate the utterance data voice with respect to the additional wake-up word, converted by the second converter 152-2. It is preferable that the modulator 152-3 extract the speech features stored in the memory 160 by using information related to the utterance data text with respect to the additional wake-up word. Here, the speech features stored in the memory 160 may include the gender of a user uttering the utterance data items with respect to the additional wake-up word, the voice, the pitch, the manner and speed of speaking, and the like; and the modulator 152-3 may modulate the utterance data voice with respect to the additional wake-up word converted by the second converter 152-2 by using the speech features stored in the memory 160.

The synthesizer 152-4 may synthesize various noises with each of the utterance data items with respect to the additional wake-up word modulated by the modulator 152-3.

The plurality of utterance data items with respect to the additional wake-up word generated by the first generator 152 may include various utterance data voices with respect to the additional wake-up word modulated by the modulator 152-3, and utterance data voices with respect to the additional wake-up word containing various noises synthesized by the synthesizer 152-4.

In some embodiments, the first generator 152 may use database (not illustrated) containing voice feature parameters previously established by analyzing a large corpus of pre-existing voice data to generate a plurality of utterance data items with respect to the additional wake-up word. Through the database of voice feature parameters, voice vector data may be generated, and the modulator 152-3 may synthesize the voice data with respect to the word serving as the additional wake-up word target with the voice vector data, thereby generating a plurality of voice data items. In order to generate utterance data items that are closer to voice as collected in real life, the modulator 152-3 may add noise to the plurality of voice data items generated. Here, the noise may be added randomly, as ambient noise, environmental noise, or any other noises that may be added to the voice of a speaker in everyday life.

Coming back to FIG. 4, the second generator 153 may learn a wake-up word recognition algorithm by using, as training input data, each of the plurality of utterance data items from the first generator 152 (various utterance data voices with respect to the additional wake-up word modulated by the modulator 152-3, and utterance data voices with respect to the additional wake-up word containing various noises synthesized by the synthesizer 152-4), and generate an additional wake-up word recognition algorithm. Here, the wake-up word recognition algorithm may receive a spoken utterance uttered by the user and use the same for speech recognition. In the present embodiment, the additional wake-up word recognition algorithm may include an algorithm which recognizes both the preset wake-up word and the additional wake-up word newly set by the user and executes a voice command included in a spoken utterance.

The determiner 154, upon receiving a select word subsequently uttered by the user, may execute an additional wake-up word recognition algorithm and determine whether to activate the speech recognition function. The determiner 154 may compare the select word uttered by the user to a preset wake-up word or a newly set additional wake-up word, and if the select word uttered by the user is identical to the preset wake-up word or the newly set additional wake-up word, the determiner 154 may output the select word uttered by the user to the controller 190 and activate the speech recognition function under control of the controller 190. Alternatively, when the select word uttered by the user differs from the preset wake-up word or the newly set additional wake-up word, the determiner 154 may output the select word uttered by the user to the controller 190 and hold the speech recognition function in an inactive state under control of the controller (190).

Figure 7:
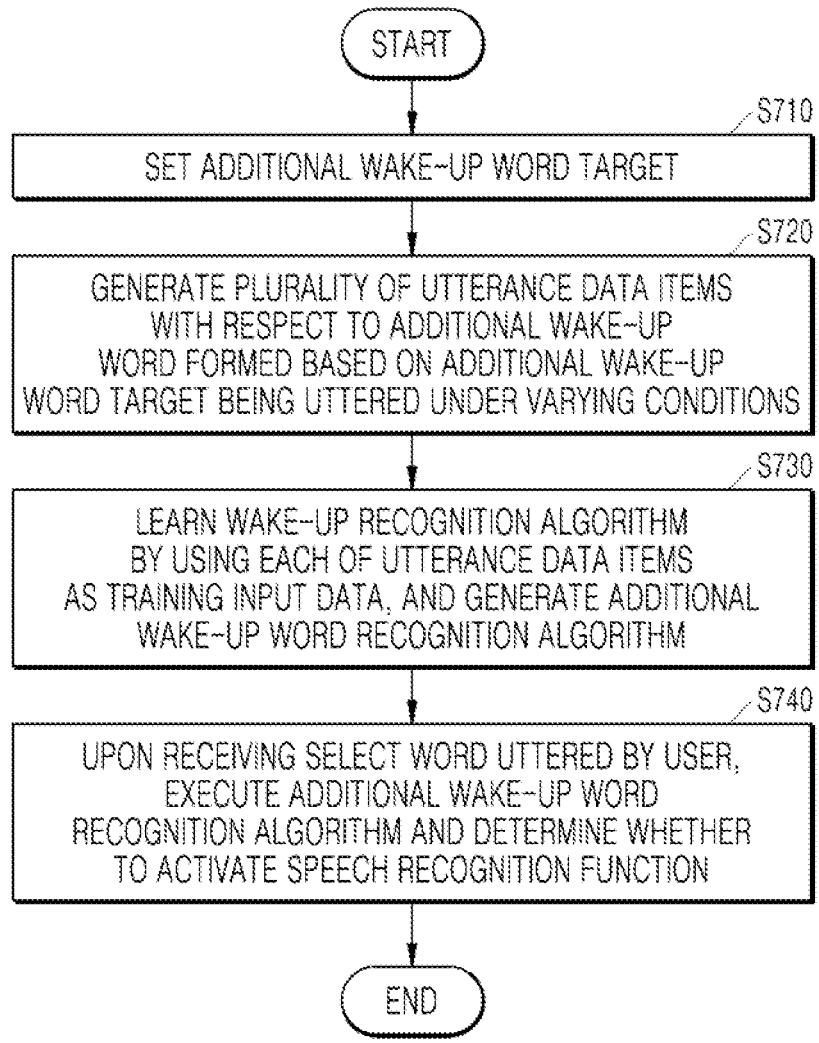
FIG. 7 is a flowchart of a speech recognition method according to an embodiment of the present disclosure.

FIG. 7 is a flowchart of a speech recognition method according to an example embodiment of the present disclosure. Hereinbelow, a repetitive description of the common parts previously described with reference to FIG. 1 to FIG. 6 will be omitted. Referring to FIG. 7, in step S710, the speech recognition device 100 may set an additional wake-up word target capable of activating a speech recognition function, in addition to a preset wake-up word. A process of setting the additional wake-up word target will be described with reference to FIG. 8 and FIG. 9.

In step S720, the speech recognition device 100 generates a plurality of utterance data items with respect to the set additional wake-up word target uttered under various conditions. The speech recognition device 100 converts the utterance data items with respect to the additional wake-up word uttered by the user into text, analyzes the grammatical structure of the text of the utterance data items with respect to the additional wake-up word, generates a prosody, and collects base units of stored voice database (DB) according to the generated prosody to convert the same to utterance data audio with respect to the additional wake-up word. The speech recognition device 100 may variously modulate the utterance data audio items with respect to the additional wake-up word by using an audio feature stored in the memory 160. The speech recognition device 100 may synthesize various noises into each of the modulated utterance data audio items with respect to the additional wake-up word. In the present embodiment, the plurality of utterance data items with respect to the additional wake-up word which the speech recognition device 100 generates may include the modulated various utterance data audio items with respect to the additional wake-up word, and the utterance data audio items with respect to the additional wake-up word containing various noises.

In step S730, using each of the plurality of utterance data items with respect to the additional wake-up word (modulated various utterance data audio items with respect to the additional wake-up word and the utterance data audio items with respect to the additional wake-up word containing various noises) as training input data, the speech recognition device 100 learns a wake-up word recognition algorithm and thereby generates an additional wake-up word recognition algorithm. In the present embodiment, the additional wake-up word recognition algorithm may include an algorithm that recognizes both the preset wake-up word and the additional wake-up word newly set by the user and executes a voice command included in a spoken utterance.

In step S740, the speech recognition device 100 upon receiving a select word uttered by the user, executes the additional wake-up word recognition algorithm to determine whether to activate the speech recognition function. By comparing the select word uttered by the user to the preset wake-up word or newly set additional wake-up word, in a case when the select word uttered by the user is identical to the preset wake-up word or the newly set additional wake-up word, the speech recognition device 100 may activate the speech recognition function. Alternatively, if the select word uttered by the user differs from the preset wake-up word or the newly set additional wake-up word, the speech recognition device 100 may hold the speech recognition function in an inactive state.

Figure 8:
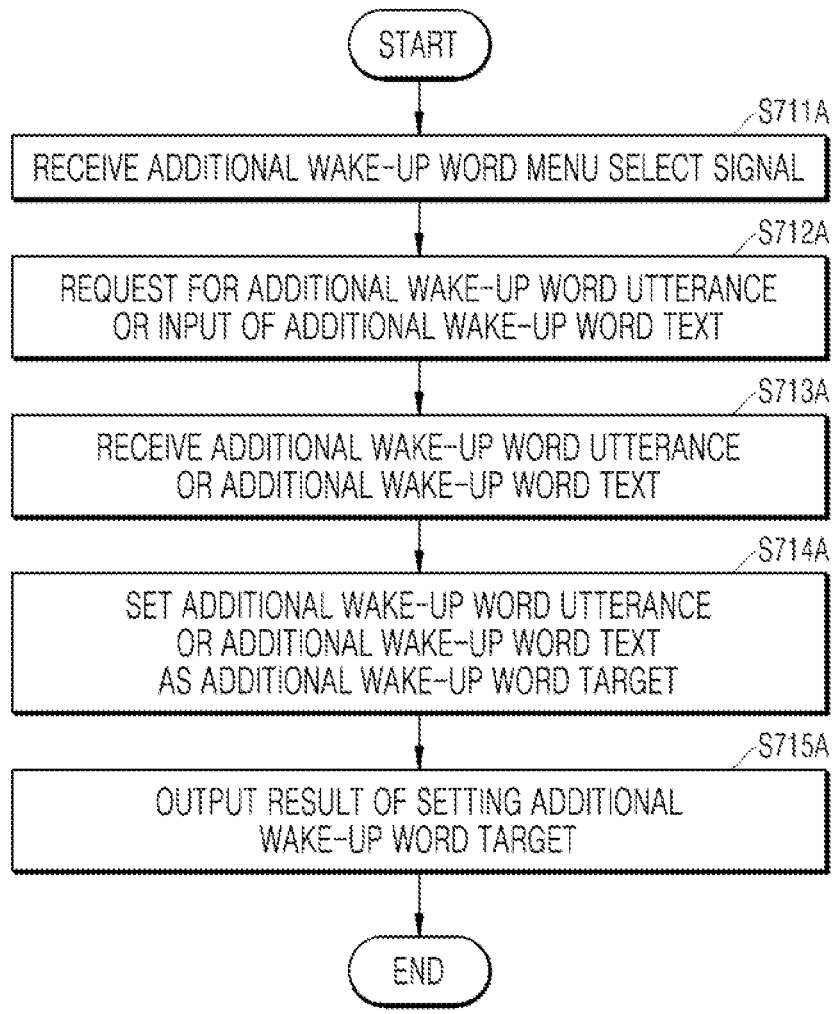
FIG. 8 is a flowchart of a process of setting an additional wake-up word target according to an embodiment of the present disclosure.

FIG. 8 is a flowchart of a process of setting an additional wake-up word target according to an embodiment of the present disclosure. Hereinbelow, a repetitive description of the parts previously described with reference to FIG. 1 to FIG. 7 will be omitted. Referring to FIG. 8, in step S711A, the speech recognition device 100 receives an additional wake-up word description menu select signal from the user.

In step S712A, the speech recognition device 100 requests spoken utterance of the additional wake-up word or text input of the additional wake-up word in response to reception of the additional wake-up word description menu select signal from the user.

In step S713A, the speech recognition device 100 receives the additional wake-up word uttered by the user or the additional wake-up word text inputted by the user.

In step S714A, the speech recognition device 100 sets the uttered additional wake-up word or inputted additional wake-up word text as an additional wake-up word target.

In step S715, the speech recognition device 100 outputs a result of setting an additional wake-up word target through the display 170 and/or the audio output unit 180.

Figure 9:
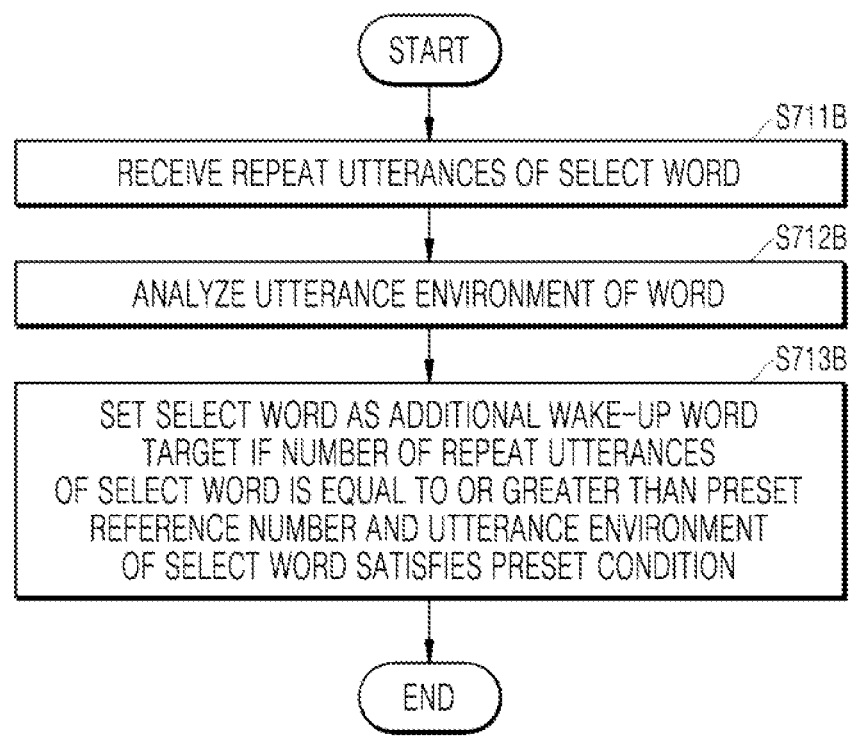
FIG. 9 is a flowchart of a process of setting an additional wake-up word target according to another embodiment of the present disclosure.

FIG. 9 is a flowchart of a process of setting an additional wake-up word target according to another embodiment of the present disclosure. Hereinbelow, a repetitive description of the common parts previously described with reference to FIG. 1 to FIG. 8 will be omitted. Referring to FIG. 9, in step S711B, the speech recognition device 100 receives repeated utterances of a select word from the user. Here, the select word may be a word different from the preset wake-up word.

In step S712B, the speech recognition device 100 analyzes an utterance environment of the select word. In addition, the speech recognition device 100 may analyze the results of calculating a distance between the user uttering a select word and the speech recognition device 100 from the proximity sensor 131. By analyzing a difference between the time data produced by the proximity sensor 131 emitting a signal and the time data produced by the time it takes for the emitted signal to come back after being reflected off the user, the speech recognition device 100 may analyze the calculation result of a distance between the user and the speech recognition device 100.

In S713B, when the number of repeated utterances of the select word is greater than or equal to a preset reference number, and the utterance environment satisfies a preset condition, the speech recognition device 100 may set the select word as an additional wake-up word target. In a case when the number of repeated utterances of the select word is greater than or equal to a preset reference number and the facial direction of the user is, within a margin of error, identical to an image-capturing direction of the image sensor 132, the speech recognition device 100 may determine that the utterance environment of the select word satisfies the preset condition and set the select word as the additional wake-up word target. Further, the number of the repeated utterances of the select word is greater than or equal to the preset reference value and the distance between the user and the speech recognition device 100 is within a preset reference distance, the speech recognition device 100 may determine that the utterance environment of the select word satisfies the preset condition and set the word as the additional wake-up word target.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of program code include both machine code, such as produced by a compiler, and higher level code that may be executed by the computer using an interpreter.

As used in the present application (especially in the appended claims), the terms 'a/an' and 'the' include both singular and plural references, unless the context clearly states otherwise. In addition, it should be understood that any numerical range recited herein is intended to include all sub-ranges subsumed therein (unless expressly indicated otherwise) and therefore, the disclosed numeral ranges include every individual value between the minimum and maximum values of the numeral ranges.

In addition, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example", etc.) used herein are merely to describe the present disclosure in greater detail. Therefore, it should be understood that the scope of the present disclosure is not limited to the example embodiments described above or by the use of such terms unless limited by the appended claims. In addition, it should be apparent to those skilled in the art that various alterations, permutations, and modifications may be made within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A speech recognition method by a speech recognition device, comprising:
   setting an additional wake-up word target in addition to a preset wake-up word, the additional wake-up word target being capable of activating a speech recognition function;
   generating a plurality of utterance data items with respect to the additional wake-up word target based on the additional wake-up word target being uttered under various conditions;
   generating an additional wake-up word recognition algorithm by training a wake-up word recognition algorithm by using each of the plurality of utterance data items as training input data; and
   determining whether to activate the speech recognition function by executing the additional wake-up recognition algorithm in response to a select word received and uttered by a user,
   wherein the setting of the additional wake-up word target includes:
   receiving repeat utterances with respect to the select word;
   analyzing an utterance environment of the select word; and
   setting the select word as the additional wake-up word target if a number of the repeat utterances of the select word is greater than or equal to a preset reference number and the utterance environment of the select word satisfies a preset condition,
   wherein the analyzing of the utterance environment includes:
   receiving and analyzing a captured image of the utterance environment of the select word, and
   wherein the setting of the additional wake-up word target includes determining that the utterance environment of the select word satisfies the preset condition and setting the select word as the additional wake-up word target if the number of the repeat utterances of the select word is greater than or equal to the preset reference number and a facial direction of the user in the captured image is toward the speech recognition device.

2. The speech recognition method of claim 1, the setting of the additional wake-up word target includes:
   receiving an additional wake-up word setting menu select signal;
   requesting for an additional wake-up word utterance in response to the additional wake-up word setting menu select signal;
   receiving the additional wake-up word utterance; and
   setting the additional wake-up word utterance as the additional wake-up word target.

3. The speech recognition method of claim 1, wherein the setting of the additional wake-up word target includes:
   receiving an additional wake-up word setting menu select signal;
   requesting for an additional wake-up word text to be inputted in response to the additional wake-up word setting menu select signal;
   receiving the additional wake-up word text; and
   setting the received additional wake-up word text as the additional wake-up word target.

4. The speech recognition method of claim 1, wherein the setting of the additional wake-up word target includes:
   receiving repeat utterances with respect to the select word; and
   setting the select word as the additional wake-up word target when a number of the repeat utterances of the select word is greater than or equal to a preset reference number.

5. The speech recognition method of claim 1, wherein the analyzing of the utterance environment includes:
   analyzing a calculation result of a distance between a user uttering the select word and the speech recognition device.

6. A speech recognition method by a speech recognition device, comprising:
   setting an additional wake-up word target in addition to a preset wake-up word, the additional wake-up word target being capable of activating a speech recognition function;
   generating a plurality of utterance data items with respect to the additional wake-up word target based on the additional wake-up word target being uttered under various conditions;
   generating an additional wake-up word recognition algorithm by training a wake-up word recognition algorithm by using each of the plurality of utterance data items as training input data; and
   determining whether to activate the speech recognition function by executing the additional wake-up recognition algorithm in response to a select word received and uttered by a user,
   wherein the setting of the additional wake-up word target includes:
   receiving repeat utterances with respect to the select word;
   analyzing an utterance environment of the select word; and
   setting the select word as the additional wake-up word target if a number of the repeat utterances of the select word is greater than or equal to a preset reference number and the utterance environment of the select word satisfies a preset condition, wherein the analyzing of the utterance environment includes:

analyzing a calculation result of a distance between a user uttering the select word and the speech recognition device, and wherein the setting of the additional wake-up word target includes:

determining that the utterance environment of the select word satisfies the preset condition if the number of the repeat utterances of the select word is greater than or equal to the preset number, and the distance between the user uttering the select word and the speech recognition device is within a preset reference distance; and setting the select word as the additional wake-up word target.

7. The speech recognition method of claim 1, wherein the generating of the plurality of utterance data items includes:

generating a plurality of voice data items with respect to the additional wake-up word target by using database of voice feature parameters; and adding noises to the plurality of voice data items.

8. A non-transitory computer program, stored in a recording medium readable by a computer, for permitting the speech recognition method of claim 1 to be executed by using the computer.

9. A speech recognition device, comprising:

a setter for setting an additional wake-up word target in addition to a preset wake-up word, the additional wake-up word target being capable of activating a speech recognition function;

a first generator for generating a plurality of utterance data items with respect to the additional wake-up word target being uttered under various conditions;

a second generator for generating an additional wake-up word recognition algorithm by learning a wake-up word recognition algorithm by using each of the plurality of utterance data items as training input data; and a determiner for determining whether to activate the speech recognition function by executing the additional wake-up recognition algorithm upon receiving a select word uttered by a user, wherein the setter includes:

a second processor configured to receive repeat utterances with respect to the select word:

an analyzer configured to analyze an utterance environment of the select word; and a second setter configured to set the select word as the additional wake-up word target if a number of the repeat utterances of the select word is equal to or greater than a preset reference number and the utterance environment of the select word satisfies a preset condition, wherein the analyzer receives and analyzes an image captured of the utterance environment of the select word, wherein if the number of the repeat utterances of the select word is greater than or equal to the preset reference number and a facial direction of the user's face in the image is toward the speech recognition device, the second setter determines that the utterance environment of the select word satisfies the preset condition and sets the select word as the additional wake-up word target.

10. The speech recognition device of claim 9, wherein the setter includes:

a first processor configured to, in response to the additional wake-up word setting menu select signal, request an additional wake-up word utterance and receiving the additional wake-up word utterance; and a first setter configured to set the additional wake-up word utterance as the additional wake-up word target.

11. The speech recognition device of claim 9, wherein the setter includes:

a first processor configured to request a spoken utterance of an additional wake-up word in response to the additional wake-up word setting menu select signal, and receive the spoken utterance of the additional wake-up word; and a first setter configured to set the spoken utterance of the additional wake-up word as the additional wake-up word target.

12. The speech recognition device of claim 9, wherein the setter includes:

a second processor configured to receive repeat utterances of the select word; and a second setter configured to set the select word as the additional wake-up word target when a number of the repeat utterances of the select word is greater than or equal to a preset reference number.

13. The speech recognition device of claim 9, wherein the analyzer analyzes a calculation result of a distance between the user and the speech recognition device.

14. The speech recognition device of claim 13, wherein if the number of the repeat utterances of the select word is greater than or equal to the preset reference number and the distance between the user uttering the select word and the speech recognition device is within a preset reference distance, the second setter determines that the utterance environment of the select word satisfies the preset condition and sets the select word as the additional wake-up word target.

15. The speech recognition device of claim 9, wherein the first generator generates a plurality of voice data items with respect to the additional wake-up word target by using pre-existing database of voice feature parameters and adds noises to the plurality of the voice data items.

* * * * *